(12) United States Patent
Graham et al.

(10) Patent No.: US 7,569,294 B2
(45) Date of Patent: Aug. 4, 2009

(54) MODULAR PORTABLE BATTERY CHARGING SYSTEM USING HYDROGEN FUEL CELLS

(75) Inventors: David Ross Graham, Harleysville, PA (US); George Amir Meski, Allentown, PA (US); Jianguo Xu, Wrightstown, PA (US); Robert Francis Horninger, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 864 days.

(21) Appl. No.: 11/020,606

(22) Filed: Dec. 23, 2004

(65) Prior Publication Data

US 2006/0138996 A1 Jun. 29, 2006

(51) Int. Cl.
*H01M 8/00* (2006.01)
*H01M 8/04* (2006.01)
*H01M 8/12* (2006.01)
*H01M 10/44* (2006.01)
*H01M 10/46* (2006.01)

(52) U.S. Cl. .............. 429/17; 429/12; 429/22; 320/101; 320/108

(58) Field of Classification Search .......... 429/13, 429/23, 53, 17, 12, 22; 320/101, 108
See application file for complete search history.

(56) References Cited

U.S. PATENT DOCUMENTS

| | | | |
|---|---|---|---|
| 4,000,003 A | 12/1976 | Baker et al. | |
| 4,343,770 A * | 8/1982 | Simons | 422/112 |
| 5,202,195 A * | 4/1993 | Stedman et al. | 429/17 |
| 5,396,162 A | 3/1995 | Brilmyer | |
| 5,565,756 A | 10/1996 | Urbish et al. | |
| 5,678,410 A | 10/1997 | Fujita et al. | |
| 6,057,051 A | 5/2000 | Uchida et al. | |
| 6,154,007 A | 11/2000 | Shaver et al. | |
| 6,326,097 B1 | 12/2001 | Hockaday | |
| 6,441,589 B1 | 8/2002 | Frerking et al. | |
| 6,858,335 B2 * | 2/2005 | Schmidt et al. | 429/13 |
| 2002/0114983 A1 | 8/2002 | Frank et al. | |
| 2002/0166286 A1 | 11/2002 | McClaine et al. | |
| 2003/0077493 A1 | 4/2003 | Colborn et al. | |
| 2004/0174072 A1 | 9/2004 | Bourilkov et al. | |

FOREIGN PATENT DOCUMENTS

| | | |
|---|---|---|
| CH | 473483 | 5/1969 |
| EP | 0788172 A1 | 8/1997 |
| WO | 03/105270 A1 | 12/2003 |

OTHER PUBLICATIONS

Journal of American Chemical Society, vol. 84, Apr. 20, 1962, pp. 1493-1494.

* cited by examiner

*Primary Examiner*—Patrick Ryan
*Assistant Examiner*—Julian Mercado
(74) *Attorney, Agent, or Firm*—Keith D. Gourley

(57) ABSTRACT

Battery charging system comprising a hydrogen source module adapted to provide gaseous hydrogen; a hydrogen fuel cell power module comprising a hydrogen fuel cell and a power delivery outlet unit adapted to transfer power generated by the fuel cell to a secondary battery for recharging the secondary battery; and coupling and transfer means adapted to connect and disconnect the hydrogen source module and the hydrogen fuel cell power module.

17 Claims, 1 Drawing Sheet

MODULAR PORTABLE BATTERY CHARGING SYSTEM USING HYDROGEN FUEL CELLS

BACKGROUND OF THE INVENTION

Battery-powered portable devices are utilized for a wide variety of personal, commercial, and military applications. Examples of these devices include digital cameras, pocket-sized calculators and personal computers, personal digital assistant (PDA) devices, wireless telephones, laptop computers, camcorders, global positioning system (GPS) devices, portable entertainment systems, games, hand tools, and military and commercial communication devices. In other applications, batteries may be used for auxiliary purposes in larger devices, for example, in a motor vehicle or boat for starting the engine and providing low-level auxiliary power for small devices such as radios and cell phones.

The batteries used in most of these devices are rechargeable and are commonly defined as secondary batteries. Examples of secondary batteries include lithium ion, lithium polymer, nickel-cadmium, nickel-hydrogen, nickel-metal hydride, and lead acid batteries. Certain types of alkaline and zinc-air cells also may be used for secondary batteries.

Some of these devices have built-in charging systems, and others require separate charging systems for the secondary batteries. The design and operating characteristics of the charging systems usually are designed for each application, typically by the vendors of the devices which use the secondary batteries. Charging systems for batteries used in one type of device often are not interchangeable with those used in another type of device, and charging devices used for a given type of device may vary among the vendors of that type of device. The user of numerous devices operating on secondary batteries may require several different types of battery chargers, of which none may be interchangeable, and thus the user may have to carry several different types of battery chargers when using the devices in portable mode.

Secondary batteries typically are recharged by connection to an external power source such as a wall receptacle in a home or office or a power outlet in a motor vehicle. There are situations, however, when an external power source is not immediately available to recharge the secondary batteries in a device. In such cases, the user may have to carry disposable primary batteries, arrange access to a portable gasoline-powered generator, or arrange access to a charging system that operates on a large storage battery system. In most situations, however, these alternatives may be undesirable or unavailable.

There is a need in the art for a portable system to recharge secondary batteries when an external power source is not available. In addition, there is a need for a system that can recharge secondary batteries used in a wide variety of devices which under normal conditions would require different recharging systems. These needs are addressed by embodiments of the invention described below and defined by the claims that follow.

BRIEF SUMMARY OF THE INVENTION

An embodiment of the invention relates to a battery charging system comprising a hydrogen source module adapted to provide gaseous hydrogen; a hydrogen fuel cell power module comprising a hydrogen fuel cell and a power delivery outlet unit adapted to transfer power generated by the fuel cell to a secondary battery for recharging the secondary battery; and coupling and transfer means adapted to connect and disconnect the hydrogen source module and the hydrogen fuel cell power module. The coupling and transfer means may be adapted to (1) place the hydrogen source module and the hydrogen fuel cell power module in gaseous hydrogen flow communication when the hydrogen source module and the hydrogen fuel cell power supply module are connected and (2) prevent gas flow from the hydrogen source module and to prevent gas flow to or from the hydrogen fuel cell power module when the hydrogen source module and the hydrogen fuel cell power supply module are disconnected.

The hydrogen source module may comprise a hydrogen storage vessel adapted to store and deliver the gaseous hydrogen. The hydrogen storage system may be selected from the group consisting of a compressed gas storage system, an adsorbed gas storage system, or a metal hydride system.

Alternatively, the hydrogen source module may comprise a hydrogen generation system adapted to generate and deliver the gaseous hydrogen. The hydrogen generation system may comprise a fluid reactant storage vessel containing a fluid reactant, a chemical hydride storage and reaction vessel containing a chemical hydride, and flow transfer means adapted to transfer the fluid reactant from the fluid reactant storage vessel to the chemical hydride storage and reaction vessel. The chemical hydride may comprise a solid phase chemical hydride. The fluid reactant may be selected from the group consisting of water, an aqueous solution, liquid or gaseous ammonia, and a liquid or gaseous alcohol. The chemical hydride may be selected from the group consisting of ammonia borane ($NH_3BH_3$), sodium borohydride, lithium borohydride, sodium aluminum hydride, lithium aluminum hydride, lithium hydride, sodium hydride, calcium hydride, magnesium hydride, aluminum metal, magnesium metal, magnesium/iron alloys, and mixtures thereof. The chemical hydride storage and reaction vessel may further comprise one or more promoters.

The battery charging system may further comprise a gas conditioning system adapted to remove one or more impurities from the gaseous hydrogen provided by the hydrogen source module. The gas conditioning system may be a vessel containing one or more materials selected from the group consisting of molecular sieve adsorbents, activated carbon adsorbents, activated alumina adsorbents, silica, calcium chloride, and calcium sulfate. The hydrogen fuel cell power module may further comprise either or both of a voltage converter and a DC to AC power inverter.

The battery charging system may further comprise a supervisory control system adapted to control the operation of either or both of the hydrogen source module and the hydrogen fuel cell power module. The hydrogen fuel cell may be selected from the group consisting of proton exchange membrane (PEM) fuel cells, phosphoric acid fuel cells, alkaline fuel cells, solid oxide fuel cells, and molten carbonate fuel cells. The power delivery outlet unit may comprise one or more electrical connectors selected from the group consisting of an AC power outlet socket, a DC power outlet connector, and a secondary battery connector. The battery charging system may further comprise a secondary battery connected to the power delivery outlet unit.

Another embodiment of the invention relates to a battery charging system comprising
(a) a hydrogen generation system comprising a fluid reactant storage vessel containing a fluid reactant, a chemical hydride storage and reaction vessel containing a chemical hydride, and flow transfer means adapted to transfer the fluid reactant from the fluid reactant storage vessel to the chemical hydride storage and reaction vessel;
(b) a hydrogen fuel cell power system comprising (1) a hydrogen fuel cell; and (2) a power delivery outlet unit adapted to transfer power generated by the fuel cell to a secondary battery for recharging the secondary battery; and (c) piping system transfer means adapted to transfer the gaseous hydrogen from the hydrogen generation system to the hydrogen fuel cell power system.

The piping system transfer means may include coupling means adapted to connect and disconnect the hydrogen generation system and the hydrogen fuel cell power system such that (1) the hydrogen generation system and the hydrogen fuel cell power system are placed in gaseous hydrogen flow communication when the hydrogen supply system and the hydrogen fuel cell power system are connected and (2) gas flow from the hydrogen generation system and gas flow to or from the hydrogen fuel cell power module are prevented when the hydrogen supply system and the hydrogen fuel cell power system are disconnected. The fluid reactant may be selected from the group consisting of water, an aqueous solution, liquid or gaseous ammonia, and a liquid or gaseous alcohol. The chemical hydride may be selected from the group consisting of ammonia borane ($NH_3BH_3$), sodium borohydride, lithium borohydride, sodium aluminum hydride, lithium aluminum hydride, lithium hydride, sodium hydride, calcium hydride, magnesium hydride, aluminum metal, magnesium metal, magnesium/iron alloys, and mixtures thereof.

The chemical hydride storage and reaction vessel may further comprise one or more promoters. The hydrogen generation system may comprise a plurality of fluid reactant storage vessels, each containing a fluid reactant, a chemical hydride storage and reaction vessel containing a chemical hydride, and a plurality of flow transfer means adapted to transfer the fluid reactant from the plurality of fluid reactant storage vessels to the chemical hydride storage and reaction vessel. The hydrogen generation system may comprise a fluid reactant storage vessel containing a fluid reactant, a plurality of chemical hydride storage and reaction vessels, each containing a chemical hydride, and a plurality of flow transfer means adapted to transfer the fluid reactant from the fluid reactant storage vessel to the plurality of chemical hydride storage and reaction vessels.

The hydrogen generation system may comprise a plurality of fluid reactant storage vessels, each containing a fluid reactant, a plurality of chemical hydride storage and reaction vessels, each containing a chemical hydride, and a plurality of flow transfer means, each adapted to transfer the fluid reactant from one of the plurality of fluid reactant storage vessels to one of the plurality of chemical hydride storage and reaction vessels. The hydrogen generation system may further comprise any of (d) a gas conditioning system adapted to remove one or more impurities from the gaseous hydrogen provided by the hydrogen generation system;

(e) either or both of a voltage converter and a DC to AC power inverter; and (f) a supervisory control system adapted to control the operation of either or both of the hydrogen generation system and the hydrogen fuel cell power system.

An alternative embodiment of the invention may include a method for charging a secondary battery comprising (a) providing a battery charging system comprising (1) a hydrogen generation system comprising a fluid reactant storage vessel containing a fluid reactant, a chemical hydride storage and reaction vessel containing a chemical hydride, and flow transfer means adapted to transfer the fluid reactant from the fluid reactant storage vessel to the chemical hydride storage and reaction vessel;

(2) a hydrogen fuel cell power system comprising a hydrogen fuel cell and a power delivery outlet unit adapted to transfer power generated by the fuel cell to a secondary battery for recharging the secondary battery; and (3) piping system transfer means adapted to transfer the gaseous hydrogen from the hydrogen generation system to the hydrogen fuel cell power system;

(b) transferring the fluid reactant from the fluid reactant storage vessel into the chemical hydride storage and reaction vessel, generating gaseous hydrogen therein, and transferring the gaseous hydrogen into the hydrogen fuel cell; and (c) generating electric power in the hydrogen fuel cell and utilizing the electrical power to recharge the secondary battery.

The method for charging the secondary battery method may further comprise any of (d) utilizing a gas conditioning system to remove one or more impurities from the gaseous hydrogen provided by the hydrogen generation system;

(e) either or both of (1) utilizing a voltage converter to change the voltage of the power generated by the fuel cell and (2) utilizing a DC to AC power inverter to convert direct current generated by the fuel cell to alternating current; and (f) controlling the operation of either or both of the hydrogen generation system and the hydrogen fuel cell power system by a supervisory control system.

BRIEF DESCRIPTION OF SEVERAL VIEWS OF THE DRAWINGS

Embodiments of the invention are illustrated in the following drawings, which are not necessarily to scale and are not meant to limit these embodiments to any of the features shown therein.

DETAILED DESCRIPTION OF THE INVENTION

Embodiments of the present invention utilize a portable secondary battery recharging system powered by a hydrogen fuel cell. The system may be modular and may be used to recharge secondary batteries for small portable devices as well as batteries used in larger mobile systems such as motor vehicles, boats, and the like. The system typically includes a hydrogen source module adapted to couple with and provide gaseous hydrogen to a hydrogen fuel cell power module. The power module includes a hydrogen fuel cell and a power delivery outlet unit adapted to transfer power generated by the fuel cell to a secondary battery for recharging the secondary battery. Coupling and transfer means may be used to connect and disconnect the hydrogen source module and the hydrogen fuel cell power module.

The power delivery outlet unit is suitable for connection with different types of secondary battery chargers or for connection directly with different types of secondary batteries. The hydrogen source module in the recharging system may have virtually unlimited shelf life and may be particularly suitable for use in emergency situations. The recharging system may be adapted to control the initiation and termination of power production depending on the charge level of the secondary battery.

Figure 1:
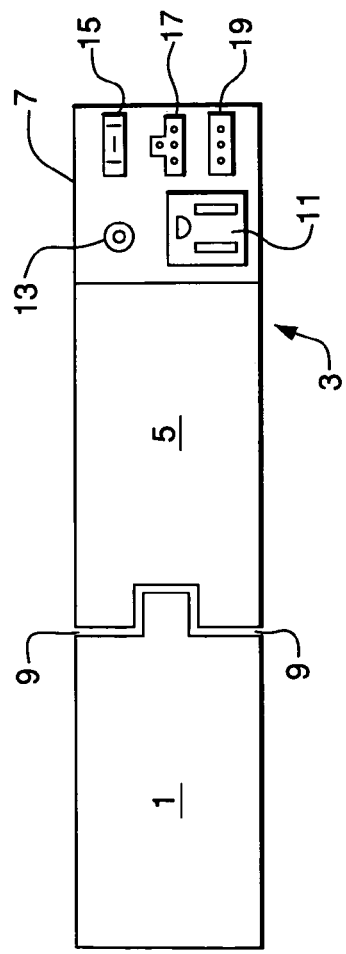
FIG. 1 illustrates a portable modular secondary battery recharging system that utilizes a hydrogen-powered fuel cell.

A first embodiment of the invention is illustrated in FIG. 1. The battery charging system comprises hydrogen source module 1 adapted to provide gaseous hydrogen to hydrogen fuel cell power module 3. Hydrogen fuel cell power module 3 includes hydrogen fuel cell 5 and power delivery outlet unit 7. Coupling and transfer means 9 is adapted to connect and disconnect hydrogen source module 1 and hydrogen fuel cell power module 3. Coupling and transfer means 9 is adapted to place hydrogen source module 1 and the hydrogen fuel cell power module 3 in gaseous hydrogen flow communication when the hydrogen source module and the hydrogen fuel cell power supply module are connected by coupling and transfer means 9. Gaseous hydrogen flow communication means that hydrogen flows from hydrogen source module 1 to hydrogen fuel cell power module 3. When hydrogen source module 1 and hydrogen fuel cell power supply module 3 are disconnected, coupling and transfer means 9 prevents gas flow from hydrogen source module 1 and prevents gas flow to or from hydrogen fuel cell power module 3. The individual components of hydrogen source module 1 as described below may be disposed in a single housing.

Coupling and transfer means 9 may include any commercially-available quick coupling or quick-connect fitting with shutoff such as, for example, those marketed by the Swagelok® Company of Solon, Ohio, USA. Coupling and transfer means 9 also may include an electrical connection or a jack adapted to transfer control signals from hydrogen fuel cell power supply module 3 to hydrogen source module 1 when the hydrogen source module and the hydrogen fuel cell power supply module are coupled as described below.

The term "module" as used herein means a self-contained unit or assembly that can be operated without the need for any externally-supplied parts. The term "coupling and transfer means" as used herein is defined as a connector device which serves two functions: first, to provide a mechanical connection that joins the two modules together during operation and disconnects the two modules if required when not in operation; and second, to provide for gaseous flow of hydrogen from the hydrogen source module to the hydrogen fuel cell power module. Optionally, the coupling and transfer means may provide a disconnectable electrical contact for conducting electrical control signals between the two modules when coupled. The coupling and transfer means may be characterized by a feature wherein no tools (i.e., wrench, pliers, screwdriver, etc.) are required to couple and uncouple the modules. The terms "charge" and "recharge" may be used interchangeably herein and have the same meaning.

The indefinite articles "a" and "an" as used herein mean one or more when applied to any feature of the present invention described in the specification and claims. The use of "a" and "an" does not limit the meaning to a single feature unless such a limit is specifically stated.

Hydrogen fuel cell 5 in hydrogen fuel cell power module 3 may be any type of hydrogen fuel cell stack known in the art and may be selected from, for example, proton exchange membrane (PEM) fuel cells, phosphoric acid fuel cells, alkaline fuel cells, solid oxide fuel cells, and molten carbonate fuel cells. The number and configuration of individual fuel cells in the stack may be specified as known in the art to provide the voltage and current necessary for any desired battery recharging service. Each fuel cell consists of two electrodes, an anode and a cathode, separated from one another by an electrolyte or ion-conducting membrane. Oxygen, typically from surrounding air, is passed over the cathode and the hydrogen is passed over the anode. Protons permeate the membrane to generate an electric current and heat, and a reaction occurs on the cathode side to produce water. Fuel cells are compact and can be operated at a temperature close to that of the surrounding atmosphere. When provided with a suitable fuel source, some fuel cells may have the additional benefit of generating significantly more power than similarly-sized conventional batteries. While other fuel cells may have a lower specific power than similarly-sized batteries, the fuel cells can operate as energy conversion devices as long as fuel and oxidant gas are supplied. In contrast, batteries can become discharged and will have to be recharged or replaced for further operation.

Power delivery outlet unit 7 is adapted to transfer the power generated by fuel cell 5 to the secondary battery being recharged. Optionally, power delivery outlet unit 7 may include either or both of a voltage converter and a DC to AC power inverter. Optionally, power delivery outlet unit 7 may include a supervisory control system adapted to control the operation of either or both of hydrogen source module 1 and hydrogen fuel cell 5, and may include means to control the process of charging a secondary battery. Alternatively or additionally, power delivery outlet unit 7 may include a battery charger so that individual batteries can be charged while removed from the devices powered by those batteries.

Power delivery outlet unit 7 may include any number of electrical outlet connectors adapted to couple with connectors associated with devices having secondary batteries that require charging. In addition, power delivery outlet unit 7 may include any number of electrical outlet connectors adapted to couple directly with secondary batteries. Exemplary electrical outlet connectors in power delivery outlet unit 7 may include socket 11 for receiving a standard two-pronged or three-pronged AC plug, jack 13 for receiving a line that supplies DC power, and secondary battery connectors 15, 17, and 19 for receiving connectors on secondary batteries or battery packs that have been removed from the devices powered by the secondary batteries. Any combination of these electrical outlet connectors may be installed in power delivery outlet unit 7.

Power delivery outlet unit 7 may include a charger that can be bypassed when not needed; alternatively, power delivery outlet unit 7 may not require a charger if intended for use only with devices having built-in chargers. For example, socket 11 or jack 13 may be designed to receive a plug or jack from a device that has a built-in charger, in which case power from fuel cell 5 is sent directly to the device during charging. Alternatively, if secondary batteries are directly coupled with connectors 15, 17, and 19, power from fuel cell 5 will supply a charger in power delivery outlet unit 7 which in turn will charge the connected secondary batteries. Power delivery outlet unit 7 may be designed so that devices can be docked in the outlet unit while the secondary batteries in the devices are being charged.

Hydrogen source module 1 may provide hydrogen from a hydrogen storage container or may generate hydrogen by contacting appropriate reactants. For example, in one embodiment the hydrogen may be provided from a compressed gas cylinder in which hydrogen is delivered by reducing the pressure of the vessel. In another embodiment, hydrogen may be stored in an adsorbed gas storage vessel and the hydrogen may be delivered by reducing the pressure of and/or heating the vessel. In a different embodiment, hydrogen may be provided from a metal hydride storage vessel and the hydrogen may be delivered by reducing the pressure of and/or heating the vessel. Any other type of hydrogen storage method may be used as desired. Alternatively, hydrogen source module 1 may comprise a system to contact and react a chemical hydride compound with a fluid reactant to generate hydrogen for supplying fuel cell 5 as described in more detail below. In any of these embodiments, a gas conditioning system may be included to remove one or more impurities from the gaseous hydrogen provided by the hydrogen source module.

Hydrogen source module 1 may be designed for single-use charging wherein the amount of hydrogen stored or generated is sufficient to operate fuel cell 5 to charge a given type of secondary battery. Alternatively, hydrogen source module 1 may be designed for multiple-use charging wherein the hydrogen flow to fuel cell 5 may be interrupted and restarted as needed. Hydrogen source module 1 may be designed to be disposable when the hydrogen is exhausted or alternatively to be refillable for future use.

Operation of the battery recharging system in this embodiment may be initiated directly by the act of connecting hydrogen source module 1 with fuel cell power supply module 3 using coupling and transfer means 9. In this mode of operation, coupling and transfer means 9 may be designed to initiate gas flow if a hydrogen storage system is used or to initiate contact of the chemical hydride compound and the fluid reactant when a hydrogen generation system is used. Alternatively, a separate step, such as turning a valve, may be required to initiate the flow of hydrogen or to initiate contact of the chemical hydride compound and the fluid reactant. When hydrogen source module 1 is disconnected from fuel cell power supply module 3, hydrogen delivery from hydrogen source module 1 is automatically terminated.

A useful feature of the embodiment described above is the modular nature of the portable modular secondary battery recharging system. Hydrogen source module 1 is designed to couple with and uncouple from with fuel cell power supply module 3 by coupling and transfer means 9, which allows the use of multiple hydrogen source modules on demand over a period of time by a user of a battery-powered device who is isolated from an external power source. Hydrogen source module 1 and fuel cell power supply module 3 each may be designed with different capacities, but will have common connectors via coupling and transfer means 9.

The need for charging a secondary battery may be infrequent. For example, a dead battery in a motor vehicle or boat may need charging in a situation isolated from an external power source where another vehicle or boat is not available for jumping the dead battery. A portable modular secondary battery charging system as described above may be carried by the motor vehicle or boat for such a situation. Because the recharging system has a virtually unlimited shelf life, it is well-suited for use on demand in such emergency situations. After the system is used and the operator of the vehicle or boat returns home, the spent hydrogen source module may be replaced with a fresh hydrogen source module or modules for future use. This portable modular secondary battery charging system may be particularly useful for a motor vehicle or boat which is operated alone for extended periods in isolated areas away from external power sources.

Figure 2:
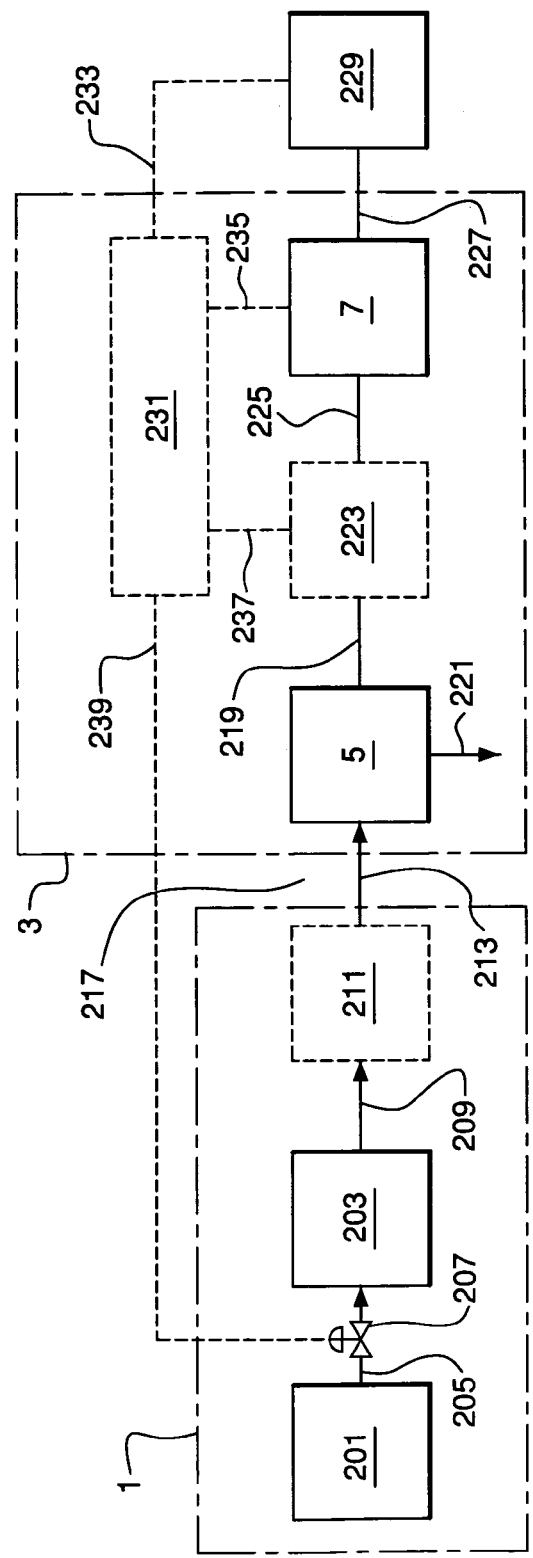
FIG. 2 is a schematic flow diagram for an embodiment of the system of FIG. 1.

Embodiments of the invention are illustrated further in FIG. 2. The battery charging system comprises hydrogen source module 1 and hydrogen fuel cell power module 3 as described above. In the embodiment illustrated here, hydrogen source module 1 comprises fluid reactant storage vessel 201 and chemical hydride storage and reaction vessel 203 which are connected by line 205 and optional flow valve 207. Chemical hydride storage and reaction vessel 203 is connected via gas line 209, optional gas conditioning system 211, and gas line 213 to hydrogen fuel cell 5 in hydrogen fuel cell power module 3. Interface 217 between hydrogen source module 1 and hydrogen fuel cell power module 3 may be the same as or similar to coupling and transfer means 9 described above with reference to FIG. 1.

The fluid reactant in storage vessel 201 may contain water, an aqueous solution, liquid or gaseous ammonia, liquid or gaseous alcohol, or any other liquid or gaseous component, wherein the fluid reactant is capable of reacting with a chemical hydride compound to generate hydrogen gas. The term "aqueous solution" may include acidic, neutral, or basic aqueous solutions. The term "solution" may include pure liquids, liquid mixtures, gels, suspensions, colloids, slurries, emulsions, and the like. Any combination of these components may be used to provide the fluid reactant.

Hydrogen gas is generated in chemical hydride storage and reaction vessel 203 by reaction of the fluid reactant from storage vessel 201 with a chemical hydride stored in vessel 203. The term "chemical hydride" means an inorganic material or materials that liberate hydrogen by irreversible reaction with a fluid reactant. Specific examples of suitable chemical hydrides include, but are not limited to, ammonia borane ($NH_3BH_3$), sodium borohydride, lithium borohydride, sodium aluminum hydride, lithium aluminum hydride, lithium hydride, sodium hydride, calcium hydride, magnesium hydride, aluminum metal, magnesium metal, and magnesium/iron alloys. These chemical hydrides may be used individually or as mixtures of more than one chemical hydride. Some chemical hydride/reactant combinations may require the application of heat to effect the reaction. The chemical hydrides may or may not include hydride ions, and may be of any suitable physical form, including but not limited to, solid, liquid and aqueous solutions.

The chemical hydride material in storage and reaction vessel 203 may be mixed with a promoter, which is defined as a material which increases the rate of the hydrogen generating reaction. A promoter may include initiators, catalysts, and the like. Suitable promoters for the reaction of the chemical hydrides described above with an aqueous solution include, but are not limited to, transition metals, transition metal borides, alloys of these materials, oxides and/or hydroxides of alkali metals or alkali earth metals, and mixtures thereof. Transition metal promoters useful in the promoter systems of the present invention are described, for example, in U.S. Pat. No. 5,804,329, in an article by H. C. Brown and C. A. Brown in the *Journal of the American Chemical Society*, Vol. 84, p. 1493 (1962), both of which are incorporated herein by reference. Transition metal promoters as used herein are promoters containing Group IB to Group VIIIB metals of the periodic table or compounds made from these metals. Examples of useful transition metal elements and compounds include, but are not limited to, ruthenium, iron, cobalt, nickel, copper, manganese, rhodium, rhenium, platinum, palladium, chromium, silver, osmium, iridium, alloys thereof, salts thereof including chlorides and borides, and mixtures thereof. Such salts may include any of cobalt chloride, iron chloride, and nickel chloride. Promoters used in embodiments of the present invention may have high surface areas and small average particles sizes. The promoter may be used in any structural physical form such as, for example, powders, granules, extrudates, or monoliths.

Fuel cell 5 may be any type of hydrogen fuel cell stack known in the art and may be selected from, for example, proton exchange membrane (PEM) fuel cells, phosphoric acid fuel cells, alkaline fuel cells, solid oxide fuel cells, and molten carbonate fuel cells. The number and configuration of individual fuel cells in the stack may be specified as known in the art to provide the voltage and current necessary for any desired battery recharging service. Hydrogen via line 213 flows to the fuel cell 5 and is utilized therein with atmospheric air to produce electric current delivered through output conductor 219 and byproduct water via line 221.

The generated current, which is DC, may be processed in optional converter unit 223 to change the voltage and/or to convert DC to AC depending on the requirements of the secondary battery being charged. The current, which has been modified as necessary in optional converter unit 223, flows via conductor 225 to power delivery outlet unit 7 described above and passes via conductor 227 to module 229, which is a secondary battery or a device having a secondary battery installed therein. Conductor 227 is connected to power delivery outlet unit 7 by socket 11, jack 13, connector 15, connector 17, or connector 19 (shown in FIG. 1).

Hydrogen fuel cell power module 3 may include optional supervisory control system 231 designed to control the operation of either or both of hydrogen source module 1 and hydrogen fuel cell power module 3, and optionally supervisory control system 231 may control the charging of the secondary battery in module 229. Supervisory control system 231 may monitor the state of charge of the secondary battery, by current draw or other suitable means, and may control the addition of fluid reactant to the chemical hydride via flow valve 207, which may be an adjustable flow control valve a simple on/off valve. Control signals to and from supervisory control system 231 may be transmitted via optional control lines 233 to module 229, 235 to power delivery outlet unit 7, 237 to optional converter unit 223, and 239 to flow valve 207. Fuel cell 5, optional converter unit 223, power delivery outlet unit 7, and optional supervisory control system 231 may be disposed in a single housing.

The operation of the secondary battery recharging system will now be described with reference to FIG. 2. The secondary batteries in module 229 are connected via conductor 227 and optionally via control line 233 to hydrogen fuel cell power module 3. Control valve 207 is opened manually or by a control signal via control line 239 and fluid reactant flows via line 205 and optionally flow valve 207 to chemical hydride storage and reaction vessel 203. The chemical hydride advantageously fills less than 60% of the vessel volume and may fill less than 40% of the vessel volume. Hydrogen is generated therein and flows via line 209 to optional conditioner 211 and via line 213 to fuel cell 5. Current is generated therein and the current passes via conductor 219 to optional converter 223, via conductor 225 to power delivery outlet unit 7, and via conductor 227 to the secondary battery in module 229.

The conditioner is an apparatus for the removal of impurities from the generated hydrogen gas. A typical impurity is water, and additionally or alternatively other contaminants may be present. A conditioner may be, for example, a drier, condenser, or adsorptive purifier to remove any water vapor that is contained in the hydrogen gas. The conditioner may be a vessel containing one or more materials selected from molecular sieve adsorbents, activated carbon adsorbents, activated alumina adsorbents, silica, calcium chloride, or calcium sulfate. The conditioner material may be, for example, Drierite manufactured by W.A. Hammond Drierite Co., Ltd. After extended use, the conditioner may become saturated with water and must be regenerated or replaced.

The hydrogen generating reaction in chemical hydride storage and reaction vessel 203 may be controlled by several different methods. In one method, the fluid reactant is pressurized in fluid reactant storage vessel 201, flow valve 207 is opened, the fluid reactant flows by pressure difference into chemical hydride storage and reaction vessel 203, hydrogen is produced, and the pressure therein increases. The pressure in chemical hydride storage and reaction vessel 203 eventually equalizes with the pressure in fluid reactant storage vessel 201; when this occurs, no additional fluid reactant flows and hydrogen generation stops. Subsequently, as hydrogen is removed from chemical hydride storage and reaction vessel 203, the pressure drops slightly, and additional fluid reactant flows to generate additional hydrogen to replace the hydrogen withdrawn therefrom.

The chemical hydride and the optional promoter may be chosen such that the hydrogen generation rate is sufficient to prevent a continuous phase of flowable reactant in chemical hydride storage and reaction vessel 203. This acts to avoid caking of the solid chemical hydride in vessel 203. As an alternative to pressurizing fluid reactant storage vessel 201, other types of motive force may be used to transfer the fluid reactant into chemical hydride storage and reaction vessel 203. For example, gravity may be used as the motive force; alternatively, motive force to transfer the fluid reactant may be stored in a spring, flexible diaphragm or bladder, or any other type of elastic vessel. Alternatively, a pump may be used as the motive force.

The hydrogen generation reaction may be controlled by utilizing flow valve 207 to control the rate of addition of the fluid reactant from fluid reactant storage vessel 201. The position of the control valve may be adjusted by a signal from supervisory control system 231 achieve the desired rate of hydrogen generation. In addition, the position of the control valve may be selected to control the rate of fluid reactant addition to prevent caking of the solid chemical hydride in vessel 203. Optionally, a check valve (not shown) may be added in series with flow valve 207 to prevent the backflow of hydrogen gas into fluid reactant storage vessel 201. Optionally, the fluid reactant may be stored in liquid form and introduced into chemical hydride storage and reaction vessel 203 as a vapor. In this option, a vaporization device for may be installed prior to chemical hydride storage and reaction vessel 203.

In another embodiment of the invention for use in an isolated or backwoods area, fluid reactant storage vessel 201 may be a syringe-type device used manually to inject water into chemical hydride storage and reaction vessel 203. In one scenario, the user would carry hydride storage and reaction vessel 203 without fluid reactant storage vessel 201. Water could be drawn from a nearby stream or pond by the syringe-type device and injected directly into chemical hydride storage and reaction vessel 203 to generate hydrogen for the fuel cell. In this embodiment, the user would control the rate of hydrogen generation by the rate of water injection.

In an alternative embodiment of current invention, two or more parallel assemblies of fluid reactant storage vessel 201, flow valve 207, and hydride storage and reaction vessel 203 may be used. Hydrogen is generated initially by opening at least one of the flow valves, and the sequence and the timing of additional valve openings may be controlled to achieve the desired flow rate of hydrogen. In one method of operating the system, for example, one valve is opened, and the other valves remain closed. Fluid reactant flows from the first fluid reactant storage vessel into the first hydride storage and reaction vessel to generate hydrogen. The amount of hydrogen generated is designed to be sufficient to charge a specific secondary battery in module 229. If additional charging is required, a second parallel assembly of fluid reactant storage vessel 201, flow valve 207, and hydride storage and reaction vessel 203 may be tapped. After the battery is charged, the charging system may be idle until a second battery requires charging. To charge the second battery, another parallel assemblies of fluid reactant storage vessel 201, flow valve 207, and hydride storage and reaction vessel 203 is activated by opening valve 207. This may be continued for charging subsequent batteries.

In a related embodiment, a plurality of hydrogen source modules 1 may be carried or stored by the user of the battery charging system. Each module comprises an assembly of fluid reactant storage vessel 201, flow valve 207, and hydride storage and reaction vessel 203. When a battery requires charging, a first hydrogen source module is coupled with hydrogen fuel cell power module 3 via coupling and transfer means 9, hydrogen is generated, and the battery is recharged as described above. At a later time, when another battery requires charging, the hydrogen source module previously used is disconnected, a fresh hydrogen source module is coupled with hydrogen fuel cell power module 3 via coupling and transfer means 9, and the battery is charged. This may be repeated until all of the hydrogen source modules are used. Alternatively, a number of hydrogen source modules may be bundled into a single container with appropriate selector means to use a new hydrogen source module for each successive battery charging operation.

In another embodiment, the hydrogen generation system may comprise a plurality of fluid reactant storage vessels, each containing a fluid reactant, a chemical hydride storage and reaction vessel containing a chemical hydride, and a plurality of flow transfer means adapted to transfer the fluid reactant from the plurality of fluid reactant storage vessels to the chemical hydride storage and reaction vessel. In a related embodiment, the hydrogen generation system may comprise a fluid reactant storage vessel containing a fluid reactant, a plurality of chemical hydride storage and reaction vessels, each containing a chemical hydride, and a plurality of flow transfer means adapted to transfer the fluid reactant from the fluid reactant storage vessel to the plurality of chemical hydride storage and reaction vessels. In another related embodiment, the hydrogen generation system may comprise a plurality of fluid reactant storage vessels, each containing a fluid reactant, a plurality of chemical hydride storage and reaction vessels, each containing a chemical hydride, and a plurality of flow transfer means, each adapted to transfer the fluid reactant from one of the plurality of fluid reactant storage vessels to one of the plurality of chemical hydride storage and reaction vessels.

The battery charging system may be designed for modular operation as described in reference to FIG. 1. The components in the system of FIG. 2 may be utilized as individual components that are not enclosed in separate housings. Alternatively, any of these individual components may be enclosed in a housing or housings in any combination. For example, fluid reactant storage vessel 201, flow valve 207, hydride storage and reaction vessel 203, and optional conditioner 211 may be enclosed in a single housing. Likewise, fuel cell 5, optional converter unit 223, power delivery outlet unit 7, and optional supervisory control system 231 may be enclosed in a single housing.

In any of the embodiments of the invention, the battery charging system optionally may include an intermediate battery or capacitor to provide a power buffer between the fuel cell and the secondary battery and/or to temporarily store excess power generated by the fuel cell.

EXAMPLE

The following Example illustrates an embodiment of the present invention but does not limit the invention to any of the specific details described therein.

Referring to the system of FIG. 2, hydride storage and reaction vessel 203 has a volume of 200 cubic centimeters and contains 20 grams of calcium hydride. The head space of this vessel consists of hydrogen gas initially at atmospheric pressure. Fluid reactant storage vessel 201 has a volume of 100 cubic centimeters and contains 30 grams of water, with the head space consisting of hydrogen gas at an initial pressure of 15 psig. Valve 207 is initially in a closed position, and hydride storage and reaction vessel 203 is not in flow communication with fluid reactant storage vessel 201. The outlet of fluid reactant storage vessel 201 is equipped with a flow restriction orifice, and the initial water flow rate exiting the vessel is 30 grams per hour or less. Conditioner 211 consists of a filter to remove any particles of calcium hydride entrained with the hydrogen and Drierite to remove water vapor from the hydrogen. Fuel cell 5 is a hydrogen polymer electrolyte membrane (PEM) electrically connected via conductors 219 and 225 to power delivery outlet unit 7. A 9.6 volt Ultralife™ UL9613MK NiCd rechargeable secondary battery is connected to power delivery outlet unit 7.

To begin charging the secondary battery, valve 207 is opened, water flows into hydride storage and reaction vessel 203, hydrogen is generated therein, and the hydrogen flows to fuel cell 5. The fuel cell generates a current of 1.6 amps at 11.6 volts and charges the battery in 60 minutes.

The invention claimed is:

1. A battery charging system comprising
   (a) a hydrogen source module adapted to provide gaseous hydrogen;
   (b) a hydrogen fuel cell power module comprising
      (1) a hydrogen fuel cell; and
      (2) a power delivery outlet unit adapted to transfer power generated by the fuel cell to a secondary battery for recharging the secondary battery; and
   (c) coupling and transfer means adapted to connect and disconnect the hydrogen source module and the hydrogen fuel cell power module.

2. The system of claim 1 wherein the coupling and transfer means is adapted to (1) place the hydrogen source module and the hydrogen fuel cell power module in gaseous hydrogen flow communication when the hydrogen source module and the hydrogen fuel cell power supply module are connected and (2) prevent gas flow from the hydrogen source module and to prevent gas flow to or from the hydrogen fuel cell power module when the hydrogen source module and the hydrogen fuel cell power supply module are disconnected.

3. The system of claim 1 wherein the hydrogen source module comprises a hydrogen storage vessel adapted to store and deliver the gaseous hydrogen.

4. The system of claim 3 wherein the hydrogen storage system is selected from the group consisting of a compressed gas storage system, an adsorbed gas storage system, or a metal hydride system.

5. The system of claim 1 wherein the hydrogen source module comprises a hydrogen generation system adapted to generate and deliver the gaseous hydrogen.

6. The system of claim 5 wherein the hydrogen generation system comprises a fluid reactant storage vessel containing a fluid reactant, a chemical hydride storage and reaction vessel containing a chemical hydride, and flow transfer means adapted to transfer the fluid reactant from the fluid reactant storage vessel to the chemical hydride storage and reaction vessel.

7. The system of claim 6 wherein the fluid reactant is selected from the group consisting of water, an aqueous solution, liquid or gaseous ammonia, and a liquid or gaseous alcohol.

8. The system of claim 6 wherein the chemical hydride is selected from the group consisting of ammonia borane ($NH_3BH_3$), sodium borohydride, lithium borohydride, sodium aluminum hydride, lithium aluminum hydride, lithium hydride, sodium hydride, calcium hydride, magnesium hydride, aluminum metal, magnesium metal, magnesium/iron alloys, and mixtures thereof.

9. The system of claim 6 which further comprises one or more promoters.

10. The system of claim 1 which further comprises a gas conditioning system adapted to remove one or more impurities from the gaseous hydrogen provided by the hydrogen source module.

11. The system of claim 10 wherein the gas conditioning system is a vessel containing one or more materials selected from the group consisting of molecular sieve adsorbents, activated carbon adsorbents, activated alumina adsorbents, silica, calcium chloride, and calcium sulfate.

12. The system of claim 1 wherein the hydrogen fuel cell power module further comprises either or both of a voltage converter and a DC to AC power inverter.

13. The system of claim 1 which further comprises a supervisory control system adapted to control the operation of either or both of the hydrogen source module and the hydrogen fuel cell power module.

14. The system of claim 1 wherein the hydrogen fuel cell is selected from the group consisting of proton exchange membrane (PEM) fuel cells, phosphoric acid fuel cells, alkaline fuel cells, solid oxide fuel cells, and molten carbonate fuel cells.

15. The system of claim 1 wherein the power delivery outlet unit comprises one or more electrical connectors selected from the group consisting of an AC power outlet socket, a DC power outlet connector, and a secondary battery connector.

16. The system of claim 1 which further comprises a secondary battery connected to the power delivery outlet unit.

17. A battery charging system comprising
  (a) a hydrogen generation system comprising a fluid reactant storage vessel containing a fluid reactant, a chemical hydride storage and reaction vessel containing a chemical hydride, and flow transfer means adapted to transfer the fluid reactant from the fluid reactant storage vessel to the chemical hydride storage and reaction vessel;
  (b) a hydrogen fuel cell power system comprising
    (1) a hydrogen fuel cell; and
    (2) a power delivery outlet unit adapted to transfer power generated by the fuel cell to a secondary battery for recharging the secondary battery; and
  (c) piping system transfer means adapted to transfer the gaseous hydrogen from the hydrogen generation system to the hydrogen fuel cell power system;
wherein the piping system transfer means includes coupling means adapted to connect and disconnect the hydrogen generation system and the hydrogen fuel cell power system such that (1) the hydrogen generation system and the hydrogen fuel cell power system are placed in gaseous hydrogen flow communication when the hydrogen supply system and the hydrogen fuel cell power system are connected and (2) gas flow from the hydrogen generation system and gas flow to or from the hydrogen fuel cell power module are prevented when the hydrogen supply system and the hydrogen fuel cell power system are disconnected.

* * * * *